Patented July 18, 1933

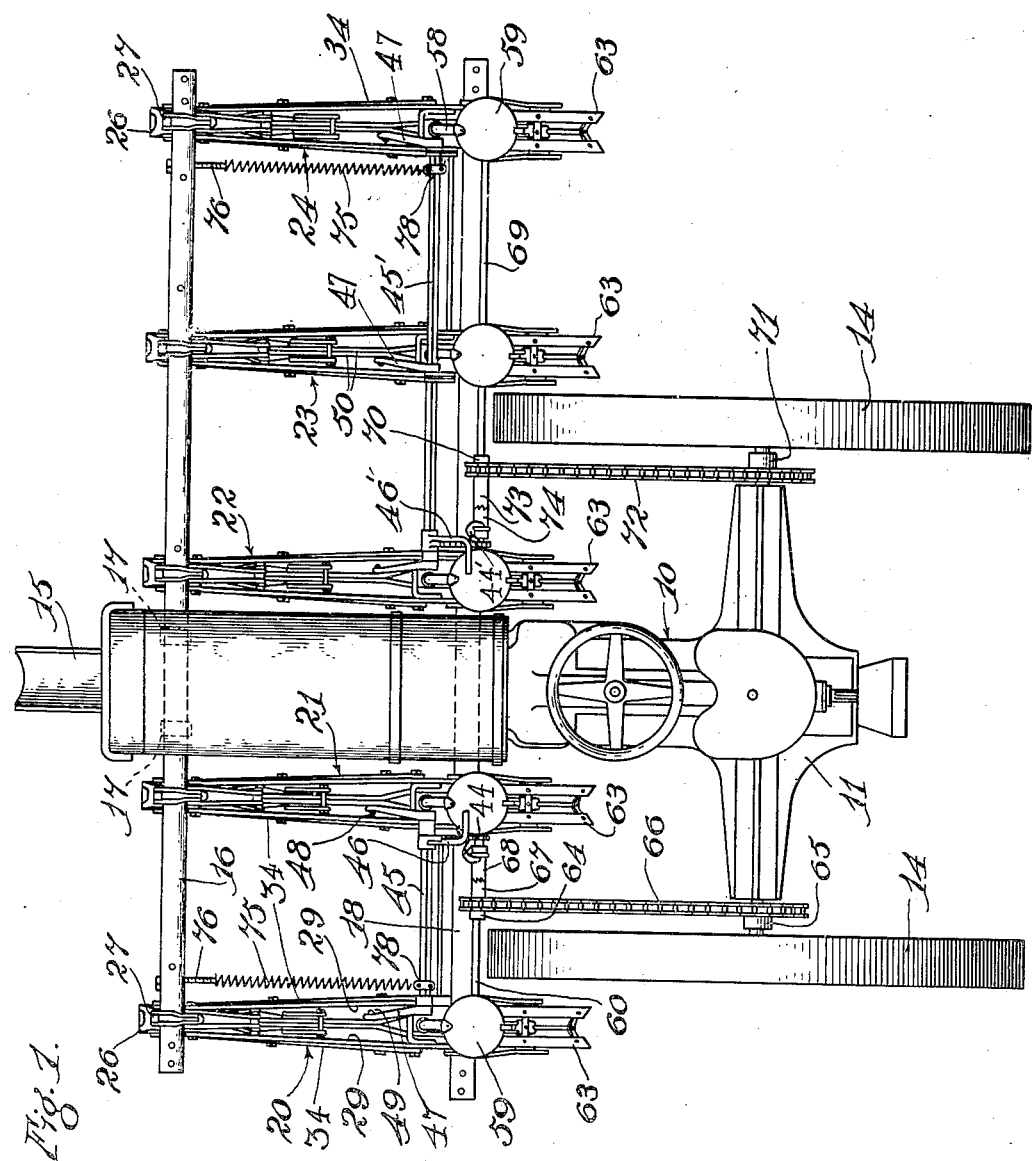

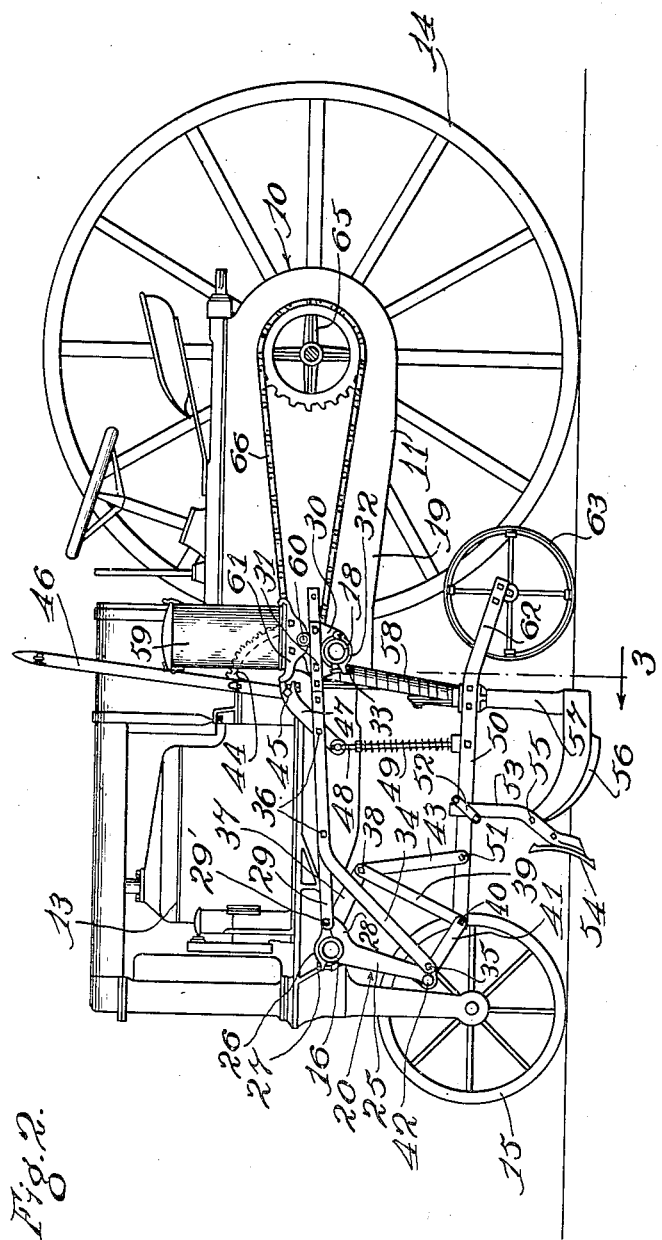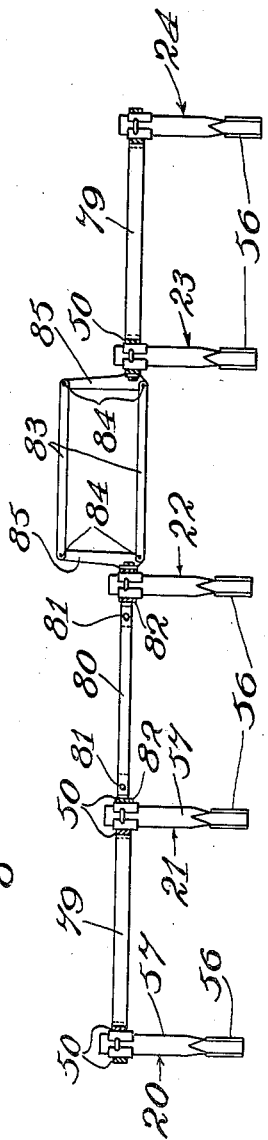

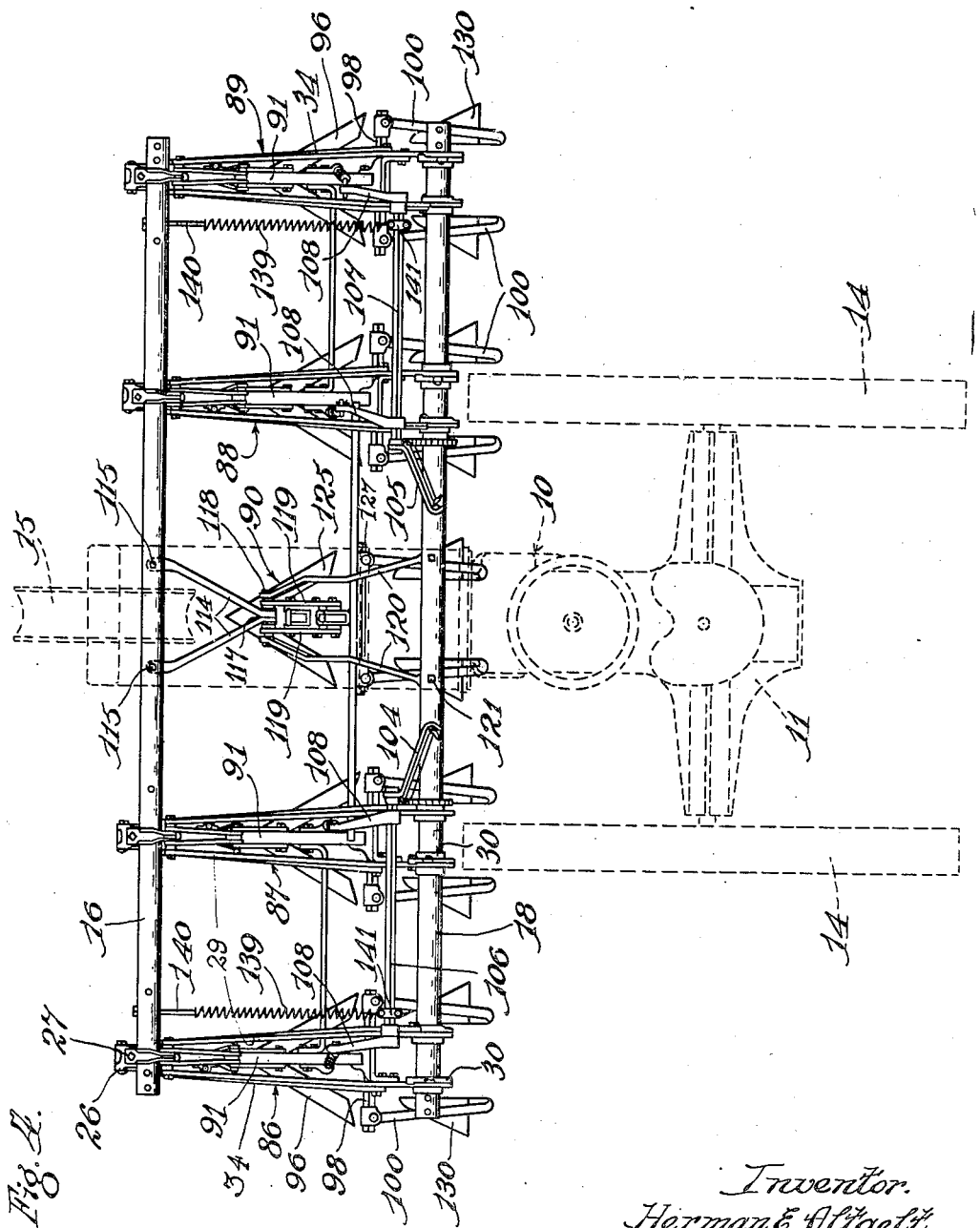

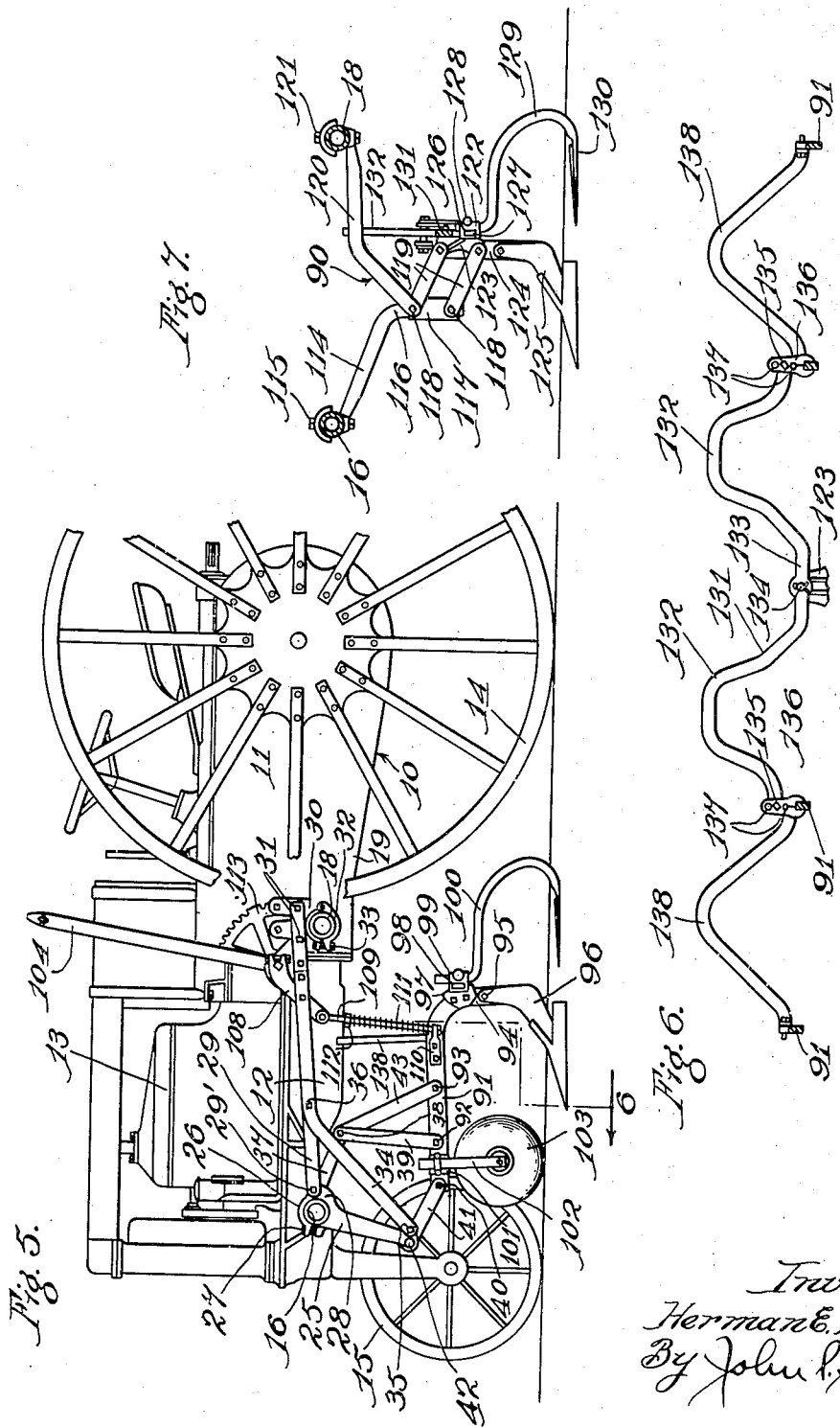

1,918,950

UNITED STATES PATENT OFFICE

HERMAN E. ALTGELT, OF SOUTH BEND, INDIANA, ASSIGNOR TO OLIVER FARM EQUIPMENT COMPANY, A CORPORATION OF DELAWARE

COMBINATION PLANTER AND CULTIVATOR

Application filed July 6, 1931. Serial No. 548,751.

The present invention is directed generally to a combination planter and cultivator attachment for general purpose tractor in which a major portion of the parts which go to make up the planter are common to that of the cultivator when it is converted from one implement to the other or vice-versa.

One of the objects of the present invention is to provide a novel and improved combination cultivator and planter in which a major portion of the parts of the planter may be bodily shifted with respect to the tractor and converted into a cultivator by substituting certain of the cultivator parts for certain of the planter parts.

A further object of the invention is to provide a novel and improved combination or convertible planter and cultivator attachment for a general purpose tractor in which the supporting means for the planter units may be shifted laterally so as to position them properly with respect to the tractor when the attachment is converted to a cultivator.

A still further object of the invention is to provide a novel and improved combination five row planter and cultivator attachment for general purpose tractor in which the supporting means thereof which carries the attachment of earth working means project on one side of the tractor a greater distance than they do on the other so as to support equally spaced apart planting units with three planting units located on one side of the tractor and two on the other side of the tractor and when converted into a cultivator, the transverse supporting beams project on equal distances on the opposite side of the longitudinal center of the tractor so that two sets or units of the earth working cultivators are located on the opposite side of the longitudinal center of the tractor with a central earth working beam located under the longitudinal center of the tractor.

A still further object of the invention is to provide a novel means for supporting and adjusting the cultivator unit under the tractor.

A still further object of the invention is to provide a novel and improved cultivating attachment for general purpose tractor in which a center cultivating beam is suspended beneath the tractor and indirectly carried by the gauge wheels of the adjacent cultivator beams.

These and other objects are accomplished by providing a construction and an arrangement of the various parts in the manner hereinafter described and particularly pointed out in the appended claims.

Referring to the drawings:

Fig. 1 is a top plan view of a general purpose tractor showing the manner in which my improved combination planter and cultivator is mounted thereon and in which the same is used as a planter with three row planting units located on one side of the longitudinal center of the tractor and two row planting units located on the other side of the tractor;

Fig. 2 is a side elevational view of the tractor and planting attachment shown in Fig. 1;

Fig. 3 is a cross sectional view taken on the line 3—3 in Fig. 2, showing the connections between the five planter beams of the planting attachment;

Fig. 4 is a top plan view of the attachment converted into a five row cultivator in which the transverse supporting beams are shifted laterally on the tractor so as to project at equal distances on opposite sides thereof and in which the center cultivating beam is located directly under and on the longitudinal center line of the tractor. The tractor in this view is shown in dotted lines;

Fig. 5 is a fragmentary side elevational view of the tractor shown in Fig. 4 illustrating the cutivating attachment, shown in Fig. 4;

Fig. 6 is a cross sectional view taken on the line 6—6 in Fig. 5;

Fig. 7 is a detailed side elevational view showing the manner in which the center cultivating beam is supported beneath the tractor on the longitudinal center thereof.

In illustrating one form of my invention, I have shown the same in connection with the conventional form of general purpose tractor generally indicated by the reference character 10, which comprises a longitudinally extending main frame including a rear transmission and axle housing casting 11 and a forward crank case housing and radiator supporting casting generally indicated by the reference character 12. Mounted on the crank case housing 12 is the usual motor or internal combustion engine 13. The tractor is provided with the usual rear traction wheels 14 and a forward dirigible or steering wheel 15.

One of the important features of the present invention consists of the provision of a combination planter and cultivator attachment for general purpose tractor in which a major portion of the planter attachment parts are common to the cultivator attachment. This arrangement not only reduces the cost to the purchaser in buying a planter and cultivator, but also simplifies the construction in converting the planter to a cultivator, inasmuch as a great number of the parts are not required to be removed when converting from one type of implement to the other type. In this connection when the five row planter is converted into a five row cultivator, the supporting beams which are attached to the tractor are shifted laterally from the position in which they support three planting units on one side, two planting units on the other side, (see Fig. 1) to a position in which they project laterally equal distances on the opposite sides of the tractor, so as to support two cultivating beams on the opposite sides of the tractor and one centrally located beam under the tractor on the longitudinal center thereof (see Fig. 4).

These two transverse supporting beams are preferably made of tubing or pipe and the forward transverse beam as indicated by the reference character 16 is attached to semicircular sockets 17 formed integrally with a crank case housing and radiator supporting main frame member 12 at a point adjacent to and rearwardly of the axis of the front steering wheel 15. The rear transverse supporting beam 18 extends through a longitudinal rib 19 formed integrally with the rear transmission and axle housing casting 11, with the adjacent portions thereof, secured and clamped in semi-circular sockets formed integrally with the rear housing member 11 in the manner disclosed in my co-pending application, Serial No. 252,930, filed March 19, 1928.

When the two implement supporting beams 16 and 18 are used in connection with supporting the planting attachment, they project laterally to the right side of the longitudinal center of the tractor, a greater distance than they do to the left, as shown in Fig. 1 of the drawings, so as to support thereon, three planter units on one side of the tractor and two planter units on the other side of the tractor. It being understood, of course, that each of these planter units are uniformly spaced apart and may be adjusted longitudinally of the beams 16 and 18 for varying the distances between the rows.

The parts of this attachment, which are common to both the planter unit and the cultivating unit, will next be described. In Fig. 1 of the drawings, five planter units are shown and are generally indicated by the reference characters 20, 21, 22, 23 and 24. These planter units are substantially identical in construction and a description of one will suffice for the others. The parts which are common to both the planter unit and the cultivating unit include a downwardly extending arm or hanger 25 which is securely clamped to the forward transverse beam 16 by means of a clamping bracket 26 and bolt 27. Secured to two spaced apart and rearwardly extending gears 28, formed integrally with the hanger 25, are two longitudinally extending frame bars 29, which in turn have their rear ends secured to a bracket 30 by means of bolts 31. The bracket 30 is secured to the upper side of the rear transverse supporting beam 18 by means of clamping member 32 and bolts 33. The hanger 25 is reinforced by diagonally disposed braces 34 located on the opposite sides. These braces have their forward ends connected by means of a bolt 35 to ears formed on the lower end of the hanger 25. The upper ends of the braces 34 extend horizontally and are secured by means of bolts 36 to each of the side bars 29. Pivotally connected to the bolt 29' adjacent the beam 16 is a rearwardly extending link 37 which is connected by means of a bolt 38 to a second link 39. The lower end of the link 39 is connected by means of a bolt 40 to a third link 41 which has its forward end pivotally connected by means of a pin 42 to the lower end of the hanger 25. These links together with the hanger, form in effect a parallelogram mechanism or a parallel link arrangement for effecting a vertical adjustment of the beam of the planter or the cultivator as the case may be. A bracing link 43 is provided which has its upper end connected to the bolt 38 and its lower end secured to the beams for maintaining a horizontal adjustment of the beam.

The mechanism thus far described, constitutes the parts which are common to both planter and cultivator attachments.

The specific parts which are required in connection with the attachment of the planting mechanism or the five row planter attachment will next be described. The planting units on the opposite sides of the tractor are adjusted by separate levers which include sectors 44 and 44' secured to the beam 18 in any well known manner. Journaled in suitable bearings secured to the beam 18 are lever shafts 45 and 45', to the inner ends of which are secured operating levers 46 and 46'. The operating levers are provided with the usual detent mechanisms for operatively locking the levers to the sectors in various positions of adjustment for regulating the depth penetration of the tools or the spring pressure thereon, or for elevating the tools to their non-operative positions.

Secured to the shafts 45 and 45' over each planting unit is a forwardly extending arm 47, which in turn has its free end connected by means of a rod 48 to the beam of the planter. Encircling the rod 48 is a pressure spring 49 which is for the purpose of exerting a downward pressure on the beam in a manner well understood in the art. Each of the planter units is provided with a longitudinally extending beam 50 which has its forward end pivotally connected by the bolt 40 to each of the links 39 and 41. The brace links 43 connected by means of a bolt 51 to the beam 50 at a point spaced from its forward end thereof. Secured to the beam 50 by means of a clamp 52 is a downwardly extending shank 53, to the lower end of which is attached a furrow opener 54. Extending rearwardly from the shank 53 and secured thereto by means of a bolt 55 is a shoe 56. The rear end of the shoe 56 is connected by means of a tube 57 to the beam 50. The tube 57 is connected by means of a flexible tubing 58 to the seeding mechanism mounted below the seed can 59. The seeding mechanism of each unit is of any well known construction. The two units on the left side of the tractor are operatively driven by means of a common drive shaft 60 which is journaled in brackets 61 which in turn are secured to the rear transverse beam 18 in any well known manner. The rear end of the beam 50 is bent downwardly as shown at 62 and has journaled thereon a gauge or press wheel 63. The drive shaft 60, which operatively drives the seeding mechanism for each of the planting units 20 and 21 is driven by means of a sprocket 64 journaled on the shaft 60 and trained to a rear axle drive sprocket 65 by means of a chain 66. The sprocket 64 is provided with a clutch engaging portion 67 which is adapted to be engaged by a complementary clutch member 68 which in turn may be controlled by any suitable form of clutch lever. The three planting units or seeding mechanisms on the right side of the tractor are operatively driven by a separate drive shaft 69 journaled in suitable bearings beneath the seed cans which in turn is provided with a drive sprocket 70, journaled on the shaft and operatively geared to a rear axle drive sprocket 71 by means of a chain 72. The sprocket 70 is provided with a clutch engaging portion 73, which in turn, is adapted to be engaged by a complementary clutch member 74 splined on the shaft 69 and adapted to be actuated into engagement by a suitable clutch lever of any well known construction. It will, of course, be understood, that each of the driving sprockets 65 and 70 are secured to the rear axle of the tractor. The weight of the two planting units on the left side of the tractor and the three planting units on the right side of the tractor, is counterbalanced by springs 75, which have their forward ends connected by means of bolts 76 to the outer portion of the forward transverse beam 16. The rear ends of the springs 75 are connected by suitable cranks and clamping members 78 to the lever shafts 45 and 45' respectively.

Each of the beams of the five planting units are connected adjacent their rear ends so as to be held apart in practically fixed distances with respect to each other and at the same time to allow for sufficient flexibility so as to permit the earth engaging parts thereof to conform to any unevenness of the ground. This arrangement comprises two outside transverse bars 79, which have their outer ends bent at right angles and secured to the beams 50 of the two outside adjacent planting units. The planting units 21 and 22 located adjacent each side of the tractor are connected by means of a bar 80 which in turn has its opposite ends pivoted by means of bolts 81 to brackets 82 secured to the inner side of the respective beams 50 of each of the planter units 21 and 22. The planter units 22 and 23 which comprise the nearest two adjacent planter units on the right side of the tractor, are connected together by parallel links or parallelogram arrangement, which includes two spaced apart parallel links 83, which have their opposite ends pivotally connected by means of bolts 84 to two oppositely disposed and vertically extending arms or brackets 85 which are respectively secured to the adjacent sides of the corresponding beam 50 of each of the respective planter units 22 and 23 as clearly shown in Fig. 3 of the drawings.

From the above description, it will be readily seen that by having the beams of the planter units 22 and 23 connected by a parallelogram arrangement, that the beam 22 will be retained in a perpendicular or vertical position while in operation. It will be further noted that in the operation of the planter, the beams of the planter units 21 and 22 and 23 and 24 can independently be moved up and down sufficiently to conform to the unevenness of the ground due to the play in the bearings of the parallelogram arrangement or parallel links which form the connection for the front end of the beams to the transverse supporting beam 16. This construction affords a five row planter in which sufficient flexibility is afforded to permit the individual unit to conform to the unevenness of the ground by reason of the connection for supporting the front end of the beam on the tractor and by reason of the flexibility of the connection between the rear end of each of the respective planter unit beams.

The changes which are necessary to convert the five row planter into a five row cultivator will next be described. It will of course, be understood that when the five row planter shown in Fig. 1 is converted into a five row cultivator shown in Fig. 4 the center planter unit 22 is completely removed as well as all of the beams 50 of the planter units 20, 12, 23 and 24. It is also necessary to remove the seed cans as well as the seeding mechanism and driving chain 66 and 72. When this has been done, clamping bolts, which clamp the two transverse beams 16 and 18 are loosened and the beams are shifted laterally so that they project laterally equal distances on the opposite sides of the tractor, after which they are again secured in place and positioned as shown in Fig. 4. When the attachment is converted into a cultivator for cultivating five rows of crop, two cultivating units are located on each side of the tractor, which are uniform in construction and generally indicated by the reference character 86, 87, 88 and 89. A special cultivating unit, generally indicated by the reference character 90, is located centrally under the tractor. The cultivating units 86, 87, 88 and 89 are identical and a description of one will suffice for the others. Each of the cultivating units is provided with a rearwardly extending beam 91 which has its forward end pivotally connected by means of the bolt 40 to the link 41. The lower end of the link 39 is secured by means of a bolt 92 to the beam 91 at a point spaced rearwardly from the forward end of the beam 91. The lower end of the link 43 is secured by means of a bolt 93 to the beam 91 at a point spaced rearwardly from the link 39, as clearly shown in Fig. 5. These links, of course, it will be understood, are the same identical links which are used in connection with supporting and operatively connecting the beams of the planter unit. Each of the beams 91 are provided with downwardly extending curved portions 94 to which is secured by means of bolts 95 a ground engaging tool 96. Secured to the beam 91 of the tool 96 is a bracket 97 to which is secured in a socket formed therein, a transverse bar 98. Secured to the opposite ends of the bar 98 by means of clamp brackets 99 are two spaced apart hook like supplemental ground engaging tools or shovels 100, which are located rearwardly with respect to and on the opposite sides of the forward ground engaging tool 96. Secured adjacent the forward end of the beam 91 by means of a clamp bracket generally indicated by the reference character 101 is a vertically disposed shank 102 which has journaled thereon a gauge wheel or disk 103. This gauge wheel 103 controls the depth penetration of the ground engaging tool.

The mechanism which effects an adjustment of the cultivating beams with respect to the tractor, includes two hand operating levers 104 and 105 which in turn are respectively secured to shafts 106 and 107. These shafts 106 and 107 are journaled in suitable bearings secured to the rear transverse beam 18. Secured adjacent the outer ends of the shafts 106 and 107 are forwardly extending cranks 108 which are located respectively over each of the four cultivator beams 91 and have their free ends connected by means of a rod 109 to a bracket 110 secured to one side of the beam 91. The rod 109 is slidably mounted in the bracket 110 so as to permit the beam 91 to raise and lower by the action of the gauge wheel 103, as the same travels over the surface of the ground. A spring 111 is mounted on the rod 109 and is normally held depressed against the bracket 110 by a collar 112, secured to the rod 109 adjacent the upper end thereof. The lifting levers 104 and 105 respectively are provided with locking sectors 113 which are secured in any well known manner to the transverse beam 18. Each of these levers are provided with the usual detent mechanism for locking the levers in various positions of adjustment.

Another novel feature of the present invention consists in a novel means for supporting and adjustably securing a center cultivating means under the tractor. This novel structure includes two rearwardly converging bars 114 which have their forward ends secured by means of bolts 115 to the underside of the transverse supporting beam 16 preferably on the opposite side of the longitudinal center of the tractor. The rearward ends of these bars 114 are bent vertically downward as shown at 116. Secured to the vertically extending portion 116 of the rearwardly converging bars 114 is a casting 117 to which is pivotally connected by means of bolts 118 two spaced apart pairs of parallel links 119. Secured to the outside of the upper links 119 by means of the upper bolts 118 are two upwardly and rearwardly extending brace bars 120 which have their rear ends spaced apart from the longitudinal center of the tractor and secured by means of bolts 121 to the under side of the rear transverse beam 18. The rear ends of the two pairs of links 119 are pivotally secured by means of bolts 122 to a vertically disposed casting 123. Secured to the casting 123 is a vertically disposed shank 124 which in turn has secured at its lower end, a cultivating shovel 125. The casting 123 is provided with a horizontally extending socket 126 in which is mounted a transverse bar 127 to the opposite ends of which are secured by means of clamping brackets 128 supplemental bent beams 129 which have formed on their lower ends, cultivating shovels or sweeps 130. Two of such beams 129 are located on the opposite sides of the shovel 125.

Another essential feature of the present invention consists of a novel arrangement of indirectly carrying the center cultivating tool and regulating its penetration in the ground by the gauge wheel of the two adjacent cultivator beams. This is accomplished by a single integral arched bar generally indicated by the reference character 131 (see Figs. 6 and 7) which is provided with two outer arch portions 132 and an intermediate depressed and horizontal portion 133. This depressed portion 133 is pivoted, by means of a pin or stud 134, to an ear which is formed integrally with the casting 123. The outer end of this arched bar is pivotally connected by means of bolts 135 to brackets 136 which in turn are secured to the next adjacent cultivator beam 91. These brackets 136 are provided with a series of apertures 137 so that the center beam located under the body of the tractor may be raised or lowered for the purpose of lining up the center beam with two adjacent outside beams or to set the earth working parts of the center beam at a higher or lower position with respect to the other beams. The beams 91 of the outermost unit 86 and 89 are connected to the beams 91 of the next adjacent units 87 and 88 by arched bars 138. Obviously this arrangement flexibly maintains the cultivating beams of these cultivator units in a relatively fixed spaced relation, however, providing sufficient flexibility so that the gauge wheels of the respective beams may control the depth penetration of the earth working tools as the same are travelling over the uneven ground. It will be further noted that by reason of the arched single bar 131 extending under the tractor and being pivotally connected to the two adjacent beams, that the center cultivator shovel will be controlled indirectly by the gauge wheel of these adjacent beams. It will also be noted that the center beam located under the tractor together with the cultivating tools carried thereby, may be simultaneously adjusted to a raised or lowered position by operating the hand levers 104 and 105 which controls the cultivating units on both sides of the tractor.

Part of the weight of these cultivating beams and tools is sustained by two extension springs 139 located adjacent the opposite ends of and connected to by means of a bolt 140 to the forward transverse beam 16, with the other ends of the springs being connected to cranks secured to the respective shafts 106 and 107 by clamping members 141.

A summary of the operation of my improved combination planter and cultivator is as follows:

It is apparent from the above description that many of the parts of the corn planter attachment and the cultivator attachment are common to both implements. Such for example, as the two transverse supporting beams carried by the tractor and the operative connections for connecting the majority of the planter units as well as the cultivator units to the front supporting means. This arrangement eliminates a duplication of parts, when an operator is desirous of having both types of implements. The planter attachment is converted from such to a cultivator attachment by merely removing the planter beams, the seeding mechanism and the necessary driving mechanism therefor as well as the center planting unit, after which, the two transverse supporting beams are moved laterally so that they project equal distances on the opposite sides of the tractor. After this has been accomplished, cultivating beams, more particularly the two outside cultivating beams are attached to the parallel link mechanism which is common to both the planter and cultivating implements. Next the raising and lowering mechanism, including the lever and detent mechanism, are mounted on the rear transverse beam and operatively connected in the rear ends of the cultivator beams. The center cultivator tool is then mounted beneath the tractor and operatively connected by the transverse arch bar to the next two adjacent cultivator beams, so that the center beam suspended beneath the tractor is adjustable with the other cultivator beams. The depth penetration of the center cultivator is indirectly controlled by the gauge wheels of each of the two adjacent beams.

From the above description it will be seen that I have provided not only a simple and efficient combination cultivator planting attachment, but one in which the major parts thereof are common to both types of attachments, thereby reducing the cost to the purchaser and also reducing the time and labor that is required to convert the attachment from a planting mechanism to a cultivating mechanism.

While in the above specification I have described one embodiment which my invention may assume in practice, it will of course be understood that the same is capable of modification and that modification may be made without departing from the spirit and scope of the invention as expressed in the following claims.

What I claim is my invention and desire to secure by Letters Patent is:

1. The combination with a tractor having front steering means and rear traction means, of two transversely extending implement supporting beams secured to said tractor, tool carrying beams located on the opposite sides of the tractor and adjustably secured to said transversely extending beams, means mounted on one of said transverse beams for adjusting said tool beams, and an earth working tool located under the longitudinal center of the tractor and secured to said transversely extending beams, and means for operatively connecting the tool under the tractor with the adjacent beams whereby said center beam may be adjusted simultaneously with the two adjacent tool beams.

2. The combination with a tractor having front steering means and rear traction means, two transversely extending implement supporting beams secured to said tractor, tool carrying beams adjustably connected to said transversely extending beams adjacent the opposite sides of said tractor, means for adjustably supporting a tool beam under said tractor, and means for adjustably connecting said last named tool beam with the adjacent tool beam, whereby the adjustment of the last named tool beam effect the adjustment of the tool beam under the tractor.

3. The combination with a tractor having front steering means and rear traction means, of two transversely extending implement supporting beams secured to said tractor, one of said beams being located rearwardly of the axis of the front steering means, and the other of said beams located forwardly of the axis of the rear traction means, earth working beams located on the opposite sides of the tractor and supported by said transversely extending beams, means for supporting an earth working beam by said transversely extending beams in a position under the tractor, an arched member connecting said center beam with the outside adjacent beams, whereby the adjustment of the outside beams effects the adjustment of the center beam.

4. The combination with a tractor having a front steering means and rear traction means, two transversely extending implement supporting beams secured to said tractor at points respectively rearwardly of the front steering means and forwardly of the rear traction means, earth working tool carrying beams secured to said transversely extending beams and located on the opposite sides of the tractor, a center tool carrying beam located under the longitudinal center of the tractor and supported on the front and rear transverse beams, and an arch bar having its intermediate portion pivoted to the center beam and its outer ends pivotally connected to outside beams, whereby the center beam may be adjustably controlled by the adjustment of the two outside beams.

5. The combination with a tractor having front steering means and rear traction means, of two transversely extending implement supporting beams secured respectively at points on the tractor adjacent to and rearwardly of the axis of the front steering means and forwardly of the axis of the rear traction means, respectively, tool carrying beams located on the opposite sides of the tractor and operatively connected to the two transverse beams, gauge wheels carried by each of said tool beams for controlling the depth penetration of each of the tools into the ground, a center tool carrying beam located under the tractor and operatively connected to the two transverse beams, and means for operatively connecting the tool beam under the tractor to the two adjacent outside beams for controlling the depth penetration of the center tool beam by the gauge wheel of the two adjacent tool beams.

6. The combination with a tractor having front steering means, and rear traction means, of transversely extending implement supporting beams secured adjacent the forward and rearward ends of the tractor, one of said beams being located adjacent to and rearwardly of the axis of the front steering means, and the other of said beams being located forwardly of the axis of the rear traction means, tool carrying beams secured to the transverse beams and located on the opposite side of the tractor, means for supporting a center tool beam under the tractor, including two rearwardly converging bars having their forward ends secured to the forward transverse beams and their rearward ends secured to said center tool beams, an arched member for retaining each of the tool beams in proper spaced relation with respect to each other, and means including said arched member for controlling the depth penetration of the center tool by the gauge wheels of each of the adjacent tool beams.

7. The combination with a tractor having front steering means and rear traction means, of two transversely extending implement supporting beams secured to said tractor, one of said beams being located forwardly of the rear traction means and the other of said beams located rearwardly of and adjacent to the axis of the front steering means, tool beams carried by said transverse beams and located on the opposite sides of the tractor, a center beam suspended beneath the tractor and carried by each of said transverse beams, and an arch member pivotally connected to the center beam and to each of the adjacent beams, whereby the depth penetration of the center beam is controlled by adjacent tool beams, adjacent the center beam.

8. The combination with a tractor having front steering means and rear traction means, of two transversely extending implement supporting beams secured to said tractor, one of said beams secured to the forward portion of said tractor at a point rearwardly of the axis of the front steering means, the other of said beams being secured to the rear portion of said tractor forwardly of the rear traction means, longitudinally extending tool carrying beams having their forward ends connected by means of parallel links to the front transverse beam and their rearward ends adjustably connected to the rear transverse beam, a center tool beam suspended beneath the tractor and having connections for securing the same to the front and rear transverse beams, parallel links operatively connecting said center beams to said first named connection, and a transverse member having two arches formed therein pivotally connected to the center tool beam and to the next adjacent outside beams whereby said center beam may be adjusted through the adjustment of said adjacent beams.

9. The combination with a tractor having front steering means and rear traction means, of two transversely extending implement supporting beams secured to said tractor, tool carrying beams located on the opposite sides of the tractor and adjustably secured to said transversely extending beams, means mounted on one of said transverse beams for adjusting said tool beams, and an earth working tool located under the longitudinal center of the tractor, and means for operatively connecting the tool under the tractor with the adjacent beams whereby said center may be adjusted simultaneously with the two adjacent tool beams.

10. The combination with a tractor having front steering means and rear traction means, two transversely extending implement supporting beams secured to said tractor at points respectively rearwardly of the front steering means and forwardly of the rear traction means, earth working tool carrying beams secured to said transversely extending beams and located on the opposite sides of the tractor, a center tool carrying beam located under the longitudinal center of the tractor, and an arch bar having its intermediate portion pivoted to the center beam and its outer ends pivotally connected to the outside beams, whereby the center beam may be adjustably controlled by the adjustment of the two outside beams.

11. The combination with a tractor having front steering means and rear traction means, of two transversely extending implement supporting beams secured to said tractor, one of said beams being located forwardly of the rear traction means and the other of said beams located rearwardly of and adjacent to the axis of the front steering means, tool beams carried by said transverse beams and located on the opposite sides of the tractor, a center beam suspended beneath the tractor, and an arch member pivotally connected to the center beam and to each of the adjacent beams, whereby the depth penetration of the center beam is controlled by adjacent tool beams adjacent the center beam.

12. The combination with a tractor having front steering means and rear traction means, of two transversely extending implement supporting beams secured to said tractor, one of said beams secured to the forward portion of said tractor, the other of said beams being secured to the rear portion of said tractor forwardly of the rear traction means, longitudinally extending tool carrying beams having their forward ends connected by means of parallel links to the front transverse beam and their rearward ends adjustably connected to the rear transverse beam, a center tool beam suspended beneath the tractor and having connections for securing the same to the front and rear transverse beams, parallel links operatively connecting said center beams to said first named connection, and a transverse member having two arches formed therein pivotally connected to the center tool beam and to the next adjacent outside beams whereby said center beam may be adjusted through the adjustment of said adjacent beams.

13. The combination with a tractor having a front steering means and rear traction means, of two transversely extending implement supporting beams secured to said tractor, a plurality of spaced apart tool carrying beams attached to said transverse beams, the rear ends of the two outermost tool carrying beams being secured in spaced relation by transverse bars, the central tool carrying beam being pivotally connected to the two adjacent beams by a transverse bar, whereby said center tool carrying beam is movable in a plane with the adjacent tool beams perpendicular to the ground.

HERMAN E. ALTGELT.